Figure 1:
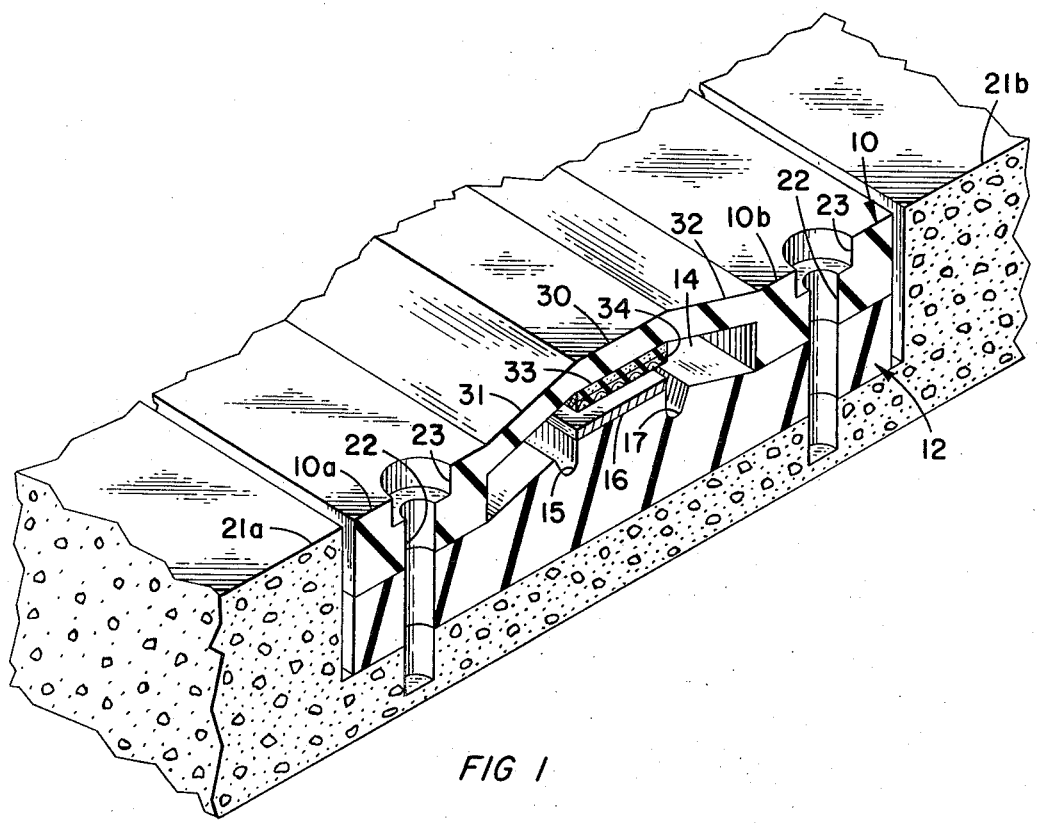

United States Patent [19]
Monroe et al.

[11] 3,818,162
[45] June 18, 1974

[54] TREADLE SWITCH

[75] Inventors: Gerald M. Monroe, Dallas; Robert J. Von Bose, Arlington, both of Tex.

[73] Assignee: The Boeing Company, Seattle, Wash.

[22] Filed: Dec. 6, 1972

[21] Appl. No.: 312,542

[52] U.S. Cl. .............................. 200/86 R, 340/272
[51] Int. Cl. ............................................ H01h 13/16
[58] Field of Search ................. 260/86 R; 340/272

[56] References Cited
UNITED STATES PATENTS

| | | | |
|---|---|---|---|
| 2,922,003 | 1/1960 | Roscoe | 200/86 R |
| 3,056,005 | 9/1962 | Larson | 200/86 R |
| 3,194,860 | 7/1965 | Ehrreich et al. | 200/86 R |
| 3,485,977 | 12/1969 | Goble | 200/86 R |

Primary Examiner—David Smith, Jr.
Attorney, Agent, or Firm—Jack A. Kanz

[57] ABSTRACT

Disclosed is a treadle switch adapted for placement in an excavation in a roadway with the outer lateral extremities of the switch coplanar with the roadway surface. The central longitudinal portion of the upper portion is elevated above the plane of the roadway surface and carries an electric contact plate on its lower surface within a central longitudinally disposed cavity in register with a lower contact plate. The switch is designed to absorb kinetic energy from the tire tread striking the switch surface when a vehicle passes thereover at high speeds.

6 Claims, 2 Drawing Figures

PATENTED JUN 18 1974   3,818,162

TREADLE SWITCH

This invention relates generally to traffic control systems employing a pair of sensors positioned across a roadway to monitor vehicular traffic passing thereover. More particularly it relates to switching apparatus responsive to both the static pressure exerted thereon by a vehicle tire and the kinetic energy associated with incremental segments of the tire tread as the tire tread initially contacts the apparatus.

Sensing devices of various designs have long been used for detecting the passage of vehicular traffic over preselected sections of roadway. Conventionally such devices are pressure sensitive devices in the general form of pneumatic tubes activating pneumatic switches when a vehicle passes thereover or treadle switches comprising electrical contact plates separated by an air space which is closed by the passage of the vehicle over the switch.

Conventional treadle switches usually comprise an elastomeric envelope having electrical contact plates supported in spaced opposed relationship on the inside surfaces of the top and bottom walls. The switch is placed transversely across the roadway and substantially coplanar with the roadway surface. When the wheels of a vehicle move across the switch the elastomeric envelope is compressed to close the contact strips.

Generally, a rolling vehicle tire does not contact the roadway tangentially. Instead, a relatively large portion of the tire tread, known as the footprint, remains in contact with the surface of the roadway at all times. The total static pressure applied to the roadway is therefore approximately the inflation pressure of the tire multiplied by the area of the footprint. For safety reasons the width of a treadle switch must be less than the transverse length of the footprint of the tire passing thereover so that contact between tire and roadway surface is never totally interrupted by the switch. The width of the switch is therefore somewhat limited.

It will be apparent that only a small portion of the total static pressure (or footprint pressure) will be available to activate the switch. It is also apparent that at higher speeds, the small portion of footprint pressure is applied to the switch for shorter periods of time, therefore reducing the total amount of energy transferred to the switch at higher speeds. In order to close the switch, sufficient energy must be absorbed by the top plate to overcome its initial inertia and accelerate the top contact toward the lower contact with sufficient energy to cause switch closure. In many conventional switches, insufficient energy is absorbed by the switch to cause switch closure when the vehicle is relatively light and traveling at high speeds. In other switches, sufficient energy is absorbed by the switch but acceleration of the top plate toward the bottom plate is so slow that switch closure is not accomplished until the tire is already two to three feet past the switch. With traffic monitoring systems having precise time-position requirements, such as that described in U.S. Pat. No. 3,689,878, the switch must close when the tire is at the switch to insure that the time required for a vehicle to travel from a first switch to a second switch may be accurately measured. With conventional switches, the minimum distance between first and second switches permissible to reduce time measurement errors has been about eleven feet. However, with such large distances between switches other problems are encountered. For example, a second axle in a multi-axled vehicle may close the first switch before the first axle has closed the second switch. It is apparent, therefore, that many problems can be overcome with a switch which closes while the tire is in contact with the switch regardless of the speed at which the vehicle is traveling.

The time-position problem may be overcome by projecting the treadle switch above the surface of the roadway so that the passing vehicle contacts the portion of the switch protruding above the roadway. The switch is then subjected to somewhat horizontal forces by the approaching vehicle. This solution, however, is unsatisfactory since a switch projecting any large distance above the roadway may be torn from its mountings by tires sliding or skidding thereover. Furthermore, vehicles traveling at a high rate of speed, when striking the protrusion, will not only close the switch but will be subjected to a severe jar or shock. The natural reaction of the pneumatic tire is to bounce over the projection, thereby causing the entire tire to lose contact with the roadway. It has also been observed that the volume of air trapped in a sealed treadle switch varies with temperature. Accordingly, in many conventional switches, increases in pressure resulting from heat can substantially vary the pressure required to close the switch and vary the rate at which the switch closes.

Figure 2:
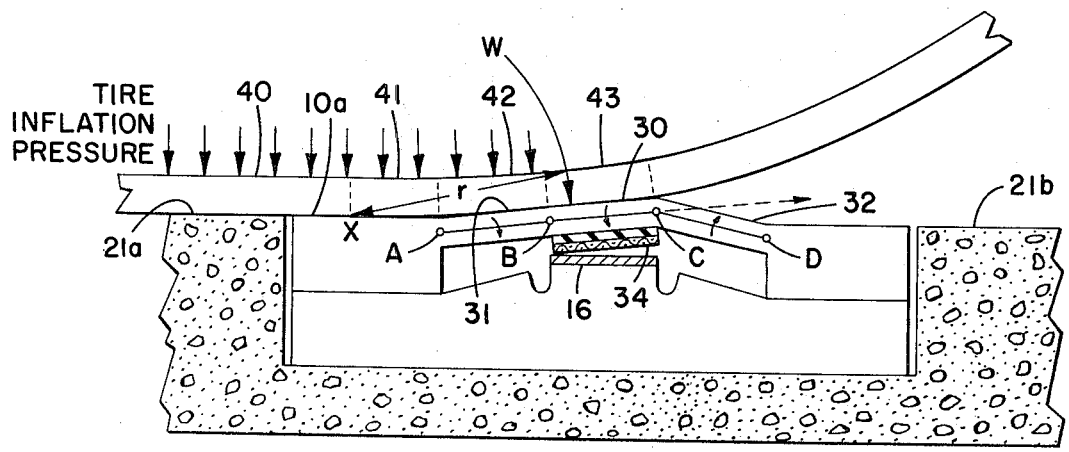

Briefly, in accordance with the present invention a switch is provided which not only operates in the normal manner to close upon application of sufficient footprint pressure in the vertical direction by the weight of the vehicle passing thereover at low speeds, but also closes upon absorption of kinetic energy associated with the tread of a rotating tire descending thereon at high speeds. Accordingly, the switch is not wholly dependent upon weight or mass of the vehicle itself. The switch reacts to detect vehicles passing thereover at low speeds in the normal fashion. It detects the passage of vehicles passing thereover at high rates of speed by absorption of kinetic energy from the tire tread without wholly depending on footprint pressure. The contour of the top surface of the switch also minimizes horizontal forces applied to the switch by an approaching tire and also includes a first portion coplanar with the roadway surface so that any lateral forces on the switch will be counteracted by the vertical pressure applied to the coplanar portion, thereby preventing damage or dislocation of the switch by skidding, sliding or fast moving tires. Other features and advantages of the invention will become more readily understood when taken in connection with appended claims and attached drawings in which:

FIG. 1 is a perspective view in section of the preferred embodiment of the invention illustrated in place in a roadway; and FIG. 2 is a schematic illustration depicting the closure mechanism of the preferred embodiment of the invention.

As illustrated in FIG. 1 the preferred embodiment of the invention comprises an elongated switch body adapted for mounting transversely on a roadway. The elongated body is comprised of upper and lower wall sections 10 and 12 joined together at their lateral extremities to form an elongated cavity 14 therebetween. The body is of sufficient length to extend across the expected path of the vehicle. Upper wall section 10 and lower wall section 14 are composed of any suitable elastomeric material such as rubber and are sealed together to completely enclose cavity 14. If desired, the lower wall section 12 may include a steel plate (not shown) along the lower side thereof providing desirable rigidity and inflexibility. As illustrated the upper wall section 10 and lower wall section 12 are of the same lateral dimensions and are preferably about four inches wide or less. Since the footprint of most vehicle tires is substantially longer than four inches, a vehicular tire passing over the switch in either direction will remain in contact with the roadway on one side of the switch until after the tire has established contact with the roadway on the opposite side of the switch. Accordingly, the switch will not ordinarily interfere with traction between the tire and the roadway surface.

As illustrated in FIG. 1 the switch is mounted in excavation in the roadway surface so that outer lateral extremities of the top surface of the upper wall section 10 are substantially coplanar with the roadway surfaces 21a and 21b on opposite sides thereof. In the preferred embodiment of the invention coplanar portions 10a and 10b are each approximately one inch in lateral length and the active portion, comprising portions 30, 31 and 32, is about two inches across. Holes 22, having counter-bored tops 23, are provided in the lateral extremities of the switch body to provide means for securely mounting the switch within the cavity in the roadway by any conventional means such as bolts or the like (not shown).

A lower electrical contact plate 16, such as a metallic ribbon, is longitudinally disposed on the top central portion of the lower wall section and extends substantially the entire length of the cavity 14. Since the contact plates 16 and 34 are subjected to mechanical abrasion upon closure, a certain amount of debris will be produced as a result of normal wear. Also moisture may be trapped within the cavity 14 when the switch is sealed. Gutters 15 and 17 are provided on opposite sides of the lower contact plate 16 to trap any moisture or debris which may collect within the cavity 14 and ensure that moisture and debris will not interfere with proper closure and electrical contact between the contact plates. As illustrated in FIG. 1 the lower contact plate 16 is slightly elevated from the plane of the top surface of the lower wall section 12, thus being the highest point in the cavity 14.

The lateral extremities 10a and 10b of the upper wall are firmly secured to the lower wall section 12, thus hermetically sealing the central cavity 14 and providing support for the central portion of the upper wall section. The central longitudinal portion 30 of the upper wall section and the adjacent portions 31 and 32 of the upper wall section are of reduced thickness relative to the outer extremities 10a and 10b, thereby defining the central cavity 14.

In the embodiment described the upper and lower wall sections are made of electrically insulating rubber. The switch therefore is readily hermetically sealed, consistently resilient, and provides electrical isolation between the contact plates. The central portion of the lower wall section supporting the lower contact strip 16 also provides a resilient support for absorbing the energy of heavy closure loads, thus limiting wear on the lower contact plate 16.

The upper contact plate is comprised of a layer or matrix of conductive rubber 33 longitudinally disposed along the underside of the central upper wall portion 30 and spaced from and aligned with the lower contact 16. A multiconductor wire, braid or screen 34, is embedded in the conductive rubber 33. The upper contact plate 33 is longitudinally and horizontally disposed above and in register with the lower contact plate 16. In the preferred embodiment the upper plate 33 is slightly narrower than the lower plate 16 so that the upper plate always meets a smooth surface on closure. The small size of the wire conductors in the upper plate 33 keeps bending stresses within reasonable fatigue limits. The matrix of conductive elastomer bonds the individual conductors to each other providing multipath shunts around any conductor breaks which might occur. The matrix also provides a broad resilient contact area against the lower contact plate 16 upon closure which reduces the contact pressure per unit area and spreads contact wear more uniformly as well as reducing the total wear. Both the shunting effect and wear reduction act to increase the operational life of the switch. Furthermore, the mass of the matrix 33 wire or screen 34 is substantially less than an equivalent metal ribbon.

As illustrated in FIG. 1 upper wall portions 31 and 32 comprise opposed cantilevered sides supported by upper wall portions 10a and 10b and deviate from the plane of the roadway surface by about 15° to about 25°, thereby supporting the central longitudinal portion 30 above the plane of the roadway surface. Central longitudinal portion 30 is preferably flat on its top surface and relatively thin to minimize its mass. Since the switch absorbs kinetic energy from the tire tread striking the switch the mass of the moving portion of the switch must be small so that its inertia may be readily overcome by the kinetic energy of the tire tread and the central portion accelerated toward the lower contact plate 16 with sufficient energy to ensure rapid closure. Likewise, supporting portions 31 and 32 are relatively thin. Sections 31 and 32, however, must be of sufficient thickness to provide the strength ncessary to support central portion 30 and have the resiliency to maintain their normal shape in the absense of vertical force exerted thereon. Therefore, in the preferred embodiment, portions 31 and 32 have a length to thickness ratio (as viewed in FIG. 1) of about 1:3 to about 1:6.

Contact plates 34 and 16 are provided with a conventional electrical interconnector means (not shown) to interconnect them with detecting apparatus. It will readily be observed that when sufficient vertical pressure is applied to central section 30, upper contact plate 33 will be forced into contact with plate 16 as in conventional treadle switches. Accordingly, the switch operates essentially the same as conventional treadle switches to detect slow moving traffic. However, as pointed out above, conventional switches cannot react with sufficient speed to insure closure of the switch while the tire is in contact with the switch. Operation of the switch of the invention in response to vehicles moving at a high velocity will now be described in reference to FIG. 2.

In FIG. 2 a rotating tire traveling on roadway surface 21a is illustrated in part by tread segments 40–43. As the tire progresses from left to right in the drawing each segment 40–43 contacts the surface over which it is traveling and remains in contact therewith for a brief period of time. The vehicle tire exerts a total vertical pressure on the area of its footprint equal to its inflation pressure multiplied by the area of its footprint. However, where the footprint is simultaneously distributed over the switch and adjacent roadway surfaces on both sides of the switch, only a small portion of the footprint pressure is distributed over the active portion of the switch. When the vehicle is moving at high speed, the footprint pressure applied to the switch may be so briefly applied that insufficient energy is transferred to the switch to accelerate the top contact toward the bottom contact and effect immediate closure.

In accordance with this invention, however, the switch is adapted to absorb the kinetic energy of the tread striking the surface of the switch as well as the footprint pressure distributed over the surface of the switch. For illustrative purposes, a vehicle tire rolling in contact with the roadway may be considered to be a plurality of tread segments 40–43 revolving about a moving center of rotation X which is approximately at the center of its footprint and directly below the center line of the axle on which that wheel is rotating. Accordingly, as illustrated in FIG. 2, an incremental segment 43 of tread approaching the switch may be considered an independent mass rotating about an instantaneous center of rotation X with an angular velocity W. Each increment of tire tread approaching the switch therefore has a mass M moving on radius r and therefore has kinetic energy $Mr^2W^2/2$. When segment 43 contacts the central portion 30 of the switch the kinetic energy of that segment is rapidly transferred to the central portion 30 of the switch causing acceleration of the central portion 30 toward the closed position at a speed much faster than could be accomplished by footprint pressure alone. It will be observed that since the kinetic energy increases with greater speed, the switch closes faster with higher rotational speeds of the rotating tire, thus promoting a stable relationship between vehicle position and switch closure.

For illustrative purposes the portion of the upper switch surface which is elevated above the roadway surface may be considered as comprised of three interconnected levers A–B (portion 31), B–C (portion 30) and C–D (portion 32).

With the segment 40 of the tire tread in contact with roadway surface 21a the next adjacent segment 41 approaches and comes in contact with the outer top extremity of the upper wall portion 10a. As the tire progresses further left to right, segment 41 contacts the top surface of portion 10a. At this point the center of rotation X is somewhere along the roadway section 21a. Segment 42 then approaches and contacts the first active switch portion A–B with an angular velocity W. The kinetic energy of the tire segment striking the switch portion A–B is transferred to the switch portion A–B and bends portion A–B downwardly. It will be observed that because the central cavity 14 is hermetically sealed, air trapped between the lower surface and portion A–B will be forced longitudinally from between the contact plates and distributed throughout the cavity causing a slight increase in pressure. The increase in pressure, however, may be considered insignificant when distributed over the entire longitudinal length of the switch.

As the tire rotates point X moves to the outer extremity 10a of the switch and segment 43 of the tire tread contacts the central portion 30 (B–C) with an angular velocity W. When the kinetic energy is sufficient to overcome the inertia of portion B–C the portion B–C is accelerated downwardly toward lower plate 16. It will thus be observed that in the configuration shown the kinetic energy of the tire segments 42 and 43 is transferred directly to moveable portions of the active portion of the switch. Since the active portions 30, 31, 32 of the switch have small masses and are somewhat independently moveable, the inertia of the switch portion is readily overcome by the kinetic energy of the tire tread and the upper contact 34 is rapidly accelerated toward closure. Because of the relatively small mass of each switch portion 30, 31 and 32, the kinetic energy of a small segment of any conventional vehicle tire tread on a vehicle traveling at speeds over about 45 miles per hour will be sufficient to cause rapid closure of the switch. Furthermore, the faster the vehicle is traveling the higher will be the angular velocity of the tire tread segment contacting portion 30. Therefore, faster vehicles will close the switch more rapidly. Accordingly, switch closure will occur while the vehicle is on the switch regardless of the speed of the vehicle, insuring accurate time-position closing of the switch.

Since the overall lateral dimensions of the switch are four inches or less, the tire footprint exceeds the width of the switch and the tire is always at least partially in contact with the roadway 21a, 21b or both. To ensure that essentially all the kinetic energy associated with the tire tread segment contacting the top central portion 30 of the switch is used to accelerate the contact plate toward closure and not wasted in stretching the portions supporting the central portion, the central portion 30 is elevated above the plane of the roadway surface a distance at least as great as the air gap between the contact plates. Accordingly, when the switch is closed the tire tread segment directly over the switch plate will be supported by the central portion 30 and will not form a bridge across the switch as may occur if the top of the switch were coplanar with the roadway surface when open. Furthermore, since the overall lateral dimensions of the switch are about four inches or less, the elevated portion of the switch, when limited to a horizontal deviation from about 15° to about 25°, is relatively small. Therefore the vehicle tire may travel over the switch with a hardly noticeable bump.

Furthermore, since the mass of the active portion of the switch is small, essentially all the kinetic energy of the tire tread segment contacting it is absorbed by the switch to accelerate the switch plate toward closure. Therefore, the protrusion of the switch above the roadway is substantially reduced before the axle passes thereover.

It will be observed that the central portion could be more highly elevated by increasing the thickness of the central portion B–C. However, increasing the thickness of central section B–C would cause a larger bump for the tire to cross and would also increase the mass, and thus the inertia, of the central section 30, thereby reducing the effectiveness of the switch. The preferred angle of 15° to 25° is only slightly greater than the angle formed by the roadway and the tangent to a typical tire tread immediately ahead of its footprint. Since the overall width of the switch is not more than about four inches, the elevation of the central portion of the switch above the roadway will be approximately one-fourth inch.

Since the cavity 14 is hermetically sealed, the volume of air trapped therein will vary with temperature. To minimize possible variations in internal pressure which would adversely affect switch operation, the volume of cavity 14 is minimized by forming the top surface of the lower wall section 12 to substantially parallel the upper wall section. The upper wall section need only flex an amount sufficient to overcome the air gap between the contact plates. Accordingly, the upper and lower wall sections need be separated by little more than the gap between the contact plates.

By sloping the top surfaces of the lower wall section downwardly from the gutters paralleling the lower contact 16 at approximately the same angle at which the cantilevered upper wall portions 31 and 32 deviate from the roadway surface, the total volume of the cavity 14 is minimized. Furthermore, since the cantilevered portions 31 and 32 can move somewhat independently, pressure changes in the cavity resulting from closure of the switch are virtually eliminated.

It has been found that switches made in accordance with the invention close when the leading edge of the tire footprint is within one inch of the central portion 30 when crossed by any conventional vehicle traveling at speeds up to at least 120 miles per hour. Since the switch is so accurate in determining the time-position of the vehicle, regardless of speed, the separation between two switches used to measure the time required to travel between the two switches can be reduced from about eleven feet (as required for conventional switches) to about five feet without any loss in accuracy. By reducing the distance separating the two switches to less than six feet, the likelihood of closure of the first switch by the second axle of a multi-axled vehicle prior to closure of the second switch by the first axle is virtually eliminated. Accordingly, complex electronic circuits conventionally used to counter this problem may be eliminated from the traffic monitoring device triggered by the switches of this invention.

While the invention has been described with particular reference to a specific embodiment thereof, it is to be understood that the form of the invention shown and described in detail is to be taken as the preferred embodiment of same and that various changes and modifications may be resorted to without departing from the spirit and scope of the invention as defined by the appended claims.

What is claimed is:

1. A switch for mounting transversely on a roadway and detecting vehicular traffic passing thereover comprising:

an elongated body having upper and lower wall sections joined to form an elongated cavity therebetween and adapted to be mounted with the outer lateral extremities of the top surface of said upper wall section substantially coplanar with the roadway surface, the central longitudinally extending portion of the top surface of said upper wall section extending above the plane of the roadway surface, a first electrical contact surface secured to and substantially centrally and longitudinally disposed along the top surface of said lower wall section, a second electrical contact surface secured to and substantially centrally and longitudinally disposed along the bottom surface said second electrical contact surface comprising a strip of relatively low mass electrical conducting material, of said upper wall section and spaced from and substantially in register with said first contact surface, the upper wall section having relatively thin opposed cantilevered sides the length of said opposed cantileversed sides being approximately three to six times the thichness thereof, supporting and connected by the central portion to which the second contact is attached, the central portion extending between the side portions having a relatively low mass and lying generally in a horizontal plane with the planes of the cantilevered sides being inclined to the plane of the roadway surface by about 15° to about 25°.

2. A switch as defined in claim 1 wherein said first electrical contact surface comprises a metallic ribbon and the portion of the top surface of said lower wall section to which ribbon is attached is elevated from the general plane of said lower wall section.

3. A switch as defined in claim 2 wherein the top surface portions of said lower wall section adjacent said central portion slope downwardly to substantially conform to the contour of the corresponding upper wall sections.

4. A switch as defined in claim 2 wherein said second electrical contact surface comprises a strip of electrically conductive rubber supporting therein a flexible screen of electrically conductive metal.

5. A switch as defined in claim 4 wherein the horizontal width of said second electrical contact surface is less than the horizontal width of said first electrical contact surface.

6. A switch as defined in claim 1 wherein the top surface of said central portion of said upper wall section projects above the plane of the roadway surface a distance at least as great as the distance separating said electrical contact surfaces.

* * * * *

UNITED STATES PATENT OFFICE
CERTIFICATE OF CORRECTION

Patent No. 3,818,162　　　　　　　　Dated　June 18, 1974

Inventor(s)　Gerald M. Monroe et al.

It is certified that error appears in the above-identified patent and that said Letters Patent are hereby corrected as shown below:

On the title page [73] Assignee: The Boeing Company, Seattle, Wash." should read -- [73] Assignee: The Boeing Company, Seattle, Wash., and Oil States Rubber Company, Arlington, Tex., jointly --.

Signed and sealed this 15th day of October 1974.

(SEAL)
Attest:

McCOY M. GIBSON JR.
Attesting Officer

C. MARSHALL DANN
Commissioner of Patents

UNITED STATES PATENT OFFICE
CERTIFICATE OF CORRECTION

Patent No. 3,818,162     Dated June 18, 1974

Inventor(s) Gerald M. Monroe et al.

It is certified that error appears in the above-identified patent and that said Letters Patent are hereby corrected as shown below:

Claim 1 should read

---A switch for mounting transversely on a roadway and detecting vehicular traffic passing thereover comprising:

an elongated body having upper and lower wall sections joined to form an elongated cavity therebetween and adapted to be mounted with the outer lateral extremities of the top surface of said upper wall section substantially coplanar with the roadway surface, the central longitudinally extending portion of the top surface of said upper wall section extending above the plane of the roadway surface, a first electrical contact surface secured to and substantially centrally and longitudinally disposed along the top surface of said lower wall section,

UNITED STATES PATENT OFFICE
CERTIFICATE OF CORRECTION

Patent No. 3,818,162          Dated June 18, 1974

Inventor(s) Gerald M. Monroe et al.

It is certified that error appears in the above-identified patent and that said Letters Patent are hereby corrected as shown below:

a second electrical contact surface secured to and substantially centrally and longitudinally disposed along the bottom surface of said upper wall section spaced from and substantially in register with said first contact surface, said second electrical contact surface comprising a strip of relatively low mass electrically conductive material, the upper wall section having relatively thin opposed cantilevered sides, the length of said opposed cantilevered sides being approximately three to six times the thickness thereof, supporting and connected by the central portion to which the second contact is attached, the central portion having a relatively low mass extending between the side portions and lying generally in a horizontal plane with the planes of the cantilevered sides deviating from the plane of the roadway surface by about 15° to about 25°.

UNITED STATES PATENT OFFICE
CERTIFICATE OF CORRECTION

Patent No. 3,818,162                    Dated June 18, 1974

Inventor(s) Gerald M. Monroe et al.

It is certified that error appears in the above-identified patent and that said Letters Patent are hereby corrected as shown below:

Claim 2 should read

--- A switch as defined in Claim 1 wherein said first electrical contact surface comprises a metallic ribbon and the portion of the top surface of said lower wall section to which said ribbon is attached is elevated from the general plane of said lower wall section. ---

Signed and sealed this 10th day of December 1974.

(SEAL)
Attest:

McCOY M. GIBSON JR.                C. MARSHALL DANN
Attesting Officer                  Commissioner of Patents